United States Patent
Zhao et al.

(10) Patent No.: US 11,222,375 B2
(45) Date of Patent: *Jan. 11, 2022

(54) DATA ANALYSIS METHOD AND SYSTEM THEREOF

(71) Applicant: INTERNATIONAL BUSINESS MACHINES CORPORATION, Armonk, NY (US)

(72) Inventors: Shiwan Zhao, Beijing (CN); Xian Wu, Beijing (CN); Quan Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1011 days.

This patent is subject to a terminal disclaimer.

(21) Appl. No.: 14/063,784

(22) Filed: Oct. 25, 2013

(65) Prior Publication Data

US 2014/0095346 A1 Apr. 3, 2014

Related U.S. Application Data

(63) Continuation of application No. 14/037,720, filed on Sep. 26, 2013.

(30) Foreign Application Priority Data

Sep. 28, 2012 (CN) .......................... 201210371691.7

(51) Int. Cl.
*G06Q 30/06* (2012.01)
*G06Q 30/02* (2012.01)
*G06Q 50/00* (2012.01)

(52) U.S. Cl.
CPC ..... *G06Q 30/0631* (2013.01); *G06Q 30/0282* (2013.01); *G06Q 30/06* (2013.01); *G06Q 50/01* (2013.01)

(58) Field of Classification Search
CPC ............. G06Q 30/06–08; G06Q 10/00; G06Q 20/00; G06Q 30/00; G06Q 40/00; G06Q 30/0631; G06Q 30/0282; G06Q 50/01
(Continued)

(56) References Cited

U.S. PATENT DOCUMENTS 7,631,008 B2 12/2009 Carson et al.
7,860,811 B2 12/2010 Flinn et al.
(Continued)

FOREIGN PATENT DOCUMENTS

CN 101079063 A 11/2007
CN 101188011 A 5/2008
(Continued)

OTHER PUBLICATIONS

"Hermandez-Rubio", "A comparative analysis of recommender systems based on item aspect opinions extracted from user reviews", User Modeling and User-Adapted Interaction (2019) 29:381-441, Nov. 20, 2018.*

*Primary Examiner* — Frantzy Poinvil
(74) *Attorney, Agent, or Firm* — Tutunjian & Bitetto, P.C.; Joseph Petrokaitis (57) ABSTRACT

A personalized data analysis method is provided, so as to find features having discrimination capability from target analysis items. In particular, a data analysis method includes: acquiring sample data; selecting discriminative features of the sample data; determining, for a target analysis item, whether it has a discriminative feature; and correlating the target analysis item with the discriminative feature in response to having the discriminative feature.

10 Claims, 5 Drawing Sheets

(58) Field of Classification Search
USPC .................................. 705/26.1–27.2, 3–44
See application file for complete search history.

(56) References Cited

U.S. PATENT DOCUMENTS

| | | | | |
|---|---|---|---|---|
| 7,945,473 | B2* | 5/2011 | Fano | G06Q 10/087 |
| | | | | 705/14.1 |
| 8,380,562 | B2* | 2/2013 | Toebes | G06Q 30/0256 |
| | | | | 705/14.49 |
| 8,650,075 | B2* | 2/2014 | Fano | G06N 99/00 |
| | | | | 705/14.1 |
| 8,949,211 | B2* | 2/2015 | Lu | G06F 17/2785 |
| | | | | 707/705 |
| 8,959,456 | B2* | 2/2015 | Tateno | G06F 3/0482 |
| | | | | 715/825 |
| 10,346,881 | B2* | 7/2019 | French | H04L 67/20 |
| 10,373,067 | B1* | 8/2019 | Chen | G06F 16/353 |
| 2001/0013009 | A1 | 8/2001 | Greening et al. | |
| 2003/0126237 | A1 | 7/2003 | Tsuchiya | |
| 2006/0041843 | A1 | 2/2006 | Billsus et al. | |
| 2008/0294617 | A1* | 11/2008 | Chakrabarti | G06F 17/30867 |
| 2009/0177691 | A1* | 7/2009 | Manfredi | G06F 16/958 |
| 2009/0222398 | A1 | 9/2009 | Allen et al. | |
| 2010/0217722 | A1 | 8/2010 | Flinn et al. | |
| 2010/0262597 | A1* | 10/2010 | Han | G06F 17/30616 |
| | | | | 707/723 |
| 2011/0047163 | A1* | 2/2011 | Chechik | G06F 17/30781 |
| | | | | 707/741 |
| 2013/0103550 | A1* | 4/2013 | Nygaard | G06Q 30/00 |
| | | | | 705/27.1 |
| 2014/0258016 | A1* | 9/2014 | Hale | G06Q 30/0631 |
| | | | | 705/26.3 |
| 2015/0347558 | A1* | 12/2015 | Blaas | G06F 17/3053 |
| | | | | 707/738 |
| 2016/0086232 | A1* | 3/2016 | French | G06Q 30/0264 |
| | | | | 705/14.66 |

FOREIGN PATENT DOCUMENTS

| | | |
|---|---|---|
| CN | 102124466 A | 7/2011 |
| CN | 102663001 A | 9/2012 |

* cited by examiner

DATA ANALYSIS METHOD AND SYSTEM THEREOF

RELATED APPLICATION DATA

This application is a Continuation application of co-pending U.S. patent application Ser. No. 14/037,720 filed on Sep. 26, 2013, incorporated herein by reference in its entirety.

TECHNICAL FIELD

Embodiments of the invention generally relate to data processing, more specifically, to data analysis and systems thereof.

BACKGROUND

Data analysis has played a critical role in many important fields. Many network applications will recommend to user commodities (including books, movies etc.) and friends. For example, in an online bookstore, when a user purchases or browses a book, the online bookstore may recommend to the user books he/she may be interested in. Also, for example, in an online social network, a user may be recommended to a friend. Online applications often make recommendations according to a user's personal data and previous network behavior. With the recommendation system, a user can easily get more information. However, many recommendation algorithms are too complex (such as Matrix Factorization, some probability based model, graph based model, and so on), even the recommendation application itself cannot explain why the user is recommended with one item instead of another. In addition, although some recommendation systems give reasons for recommendation, these reasons are not personalized; instead, the systems make recommendations based on general-purpose reasons. For example, when a user browses a book A in an online bookstore, the online bookstore recommends to the user book B, because other users who bought book A also bought book B.

SUMMARY

In order to provide a personalized data analysis method so as to find discriminative features from target analysis items, the invention provides a data analysis scheme.

Specifically, the invention provides a data analysis method, comprising: acquiring sample data, wherein the sample data contains positive sample data and negative sample data, the positive sample data includes user preferred items and the negative sample data includes user disliked items; selecting discriminative features of the sample data, wherein the discriminative features include features having discrimination capability for discriminating items in the positive sample data and the negative sample data; determining, for at least one target analysis item, whether it has at least one discriminative feature; and correlating the at least one target analysis item with the at least one discriminative feature in response to having the at least one discriminative feature.

The invention also provides a data analysis system, comprising: an acquiring means configured to acquire sample data, wherein the sample data contains positive sample data and negative sample data, the positive sample data includes user preferred items and the negative sample data includes user disliked items; a selection means configured to select discriminative features of the sample data, wherein the discriminative features include features having a discrimination capability for discriminating items in the positive sample data and the negative sample data; a determination means configured to determine, for at least one target analysis item, whether it has at least one discriminative feature; and a correlation means configured to correlate the at least one target analysis item with the at least one discriminative feature in response to having the at least one discriminative feature.

With the data analysis scheme of the invention, discriminative features can be identified from target analysis items in a personalized manner, so as to make data analysis results to be more thorough and rich.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art. Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
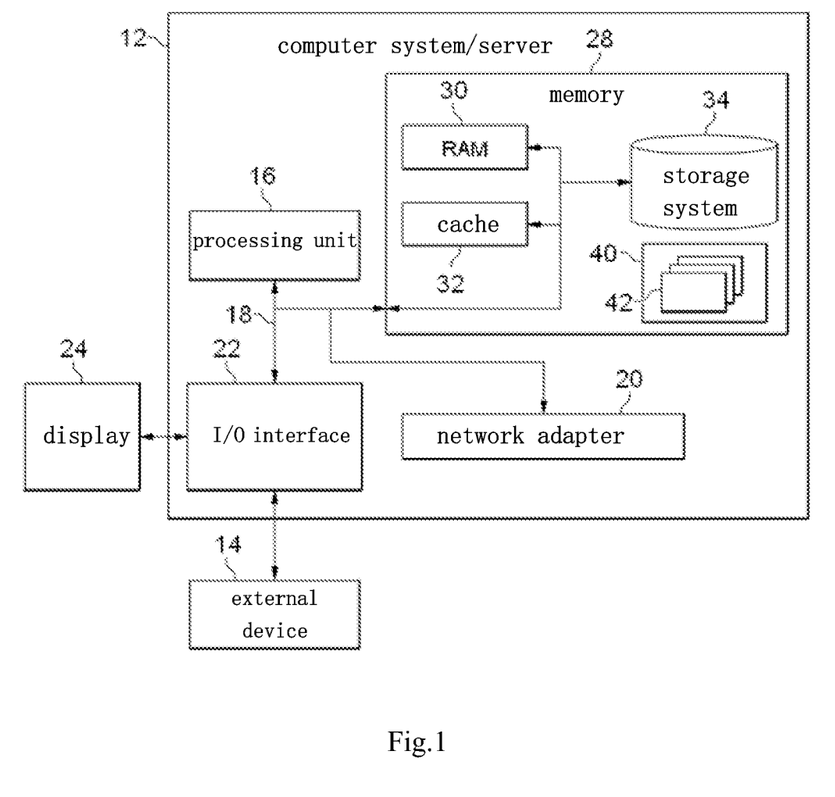
FIG. 1 shows a block diagram of an exemplary computer system 100 which is applicable to implement the embodiments of the present invention.

FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
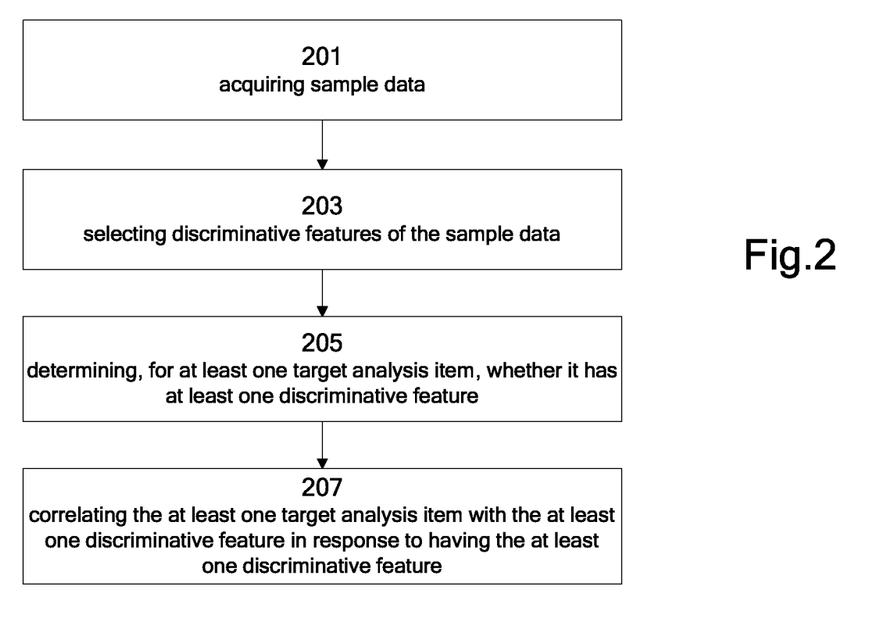
FIG. 2 shows a flowchart of a data analysis method according to an embodiment of the invention.

FIG. 2 shows a flowchart of a data analysis method according to an embodiment of the invention. In step 201, sample data is acquired. In step 203, discriminative features of the sample data are selected. In step 205, for at least one target analysis item, it is determined whether the target analysis item has at least one discriminative feature. In step 207, correlating the at least one target analysis item with the at least one discriminative feature in response to having the at least one discriminative feature. In an example, with the method shown in FIG. 2, a user may be provided with explanation of recommending movies for him/her. Each step of the method shown in FIG. 2 will be described below in detail.

Specifically, in step 201, acquiring sample data, wherein the sample data contains positive sample data and negative sample data, the positive sample includes user preferred items and the negative sample data includes user disliked items.

According to an embodiment of the invention, the user may be a single user, such that the embodiment may dig personalized discriminative features for a single user. According to another embodiment of the invention, the user may also be a set of multiple users (such as, multiple users in an interest group); such that the embodiment may dig personalized discriminative features for a group of users according to behaviors of that group.

According to an embodiment of the invention, the item may be at least one of: commodity, other user. The commodity may be tangible commodity such as that sold in an online shopping store; or may be intangible commodity available for download, such as e-books, electronic music, movies etc. The other user may be friend of the user, followee of the user, follower of the user, other user having same interest, other user in a same group etc. The following description primarily takes movie for an example, however, the invention is not only limited to analysis on movie data.

Including positive sample data and negative sample data in sample data may make discriminative features selected in subsequent steps have discrimination capability. If only positive sample data is used, only features in positive sample data may be selected, however, features in positive sample data may in fact not have discrimination capability. For example, if positive sample data contains 10 movies and negative sample data also contains 10 movies, and 7 movies from each of positive sample data and negative sample data are acted by leading role Tom, in case that only positive sample data is contained in sample data, then feature of "leading role Tom" will be selected as a discriminative feature according to the steps discussed later. However, in fact, "leading role Tom" does not have discrimination capability, because the possibility that "leading role Tom" appears in the positive sample is the same as that in the negative sample. Thus, including positive sample data and negative sample data in sample data in the present embodiment may make discriminative features selected in subsequent steps have discrimination capability.

According to an embodiment of the invention, amount of the positive sample data is the same as that of the negative sample data. According to another embodiment of the invention, amount of the positive sample data is different from that of the negative sample data.

According to an embodiment of the invention, the step 201 of acquiring sample data further comprises: acquiring sample data according to at least one of: operation history of the user, recommendation results generated by a recommendation system for the user.

The invention has no limitation on the recommendation system, it may include any recommendation system using any recommendation algorithm. According to an embodiment of the invention, if discriminative feature is determined for items in result recommended by the recommendation system, i.e., the target analysis items are from the recommendation result, then results recommended by the recommendation system for the user are contained in sample data. As for the target analysis items, hit rate of determining discriminative features for target analysis items may be further improved, since the discriminative features are obtained based on sample data containing the target analysis items. More specifically, if recommendation result is contained in sample data, then probability that at least one target analysis item of the recommendation result contains discriminative feature will be higher.

According to an embodiment of the invention, the recommendation result may contain positive recommendation result and negative recommendation result. The positive recommendation result may be movies recommended for user to watch, and the negative recommendation result may be movies not recommended for user to watch, for example. In a common network application, although a recommendation system will only present positive recommendation result but not negative recommendation result, the recommendation system often stores both positive recommendation result and negative recommendation result.

According to an embodiment of the invention, the operation history comprises at least one of: score given by the user on an item, operation conducted by the user on an item, comment made by the user on an item. Wherein, score given by the user on an item may employ any measurement approach, such as five-point scale, ten-point scale, and one-hundred-point scale, etc. Taking five-point scale for example, items scored by user as 4 or 5 may be set as positive sample data, and items scored by user as 1, 2 or 3 may be set as negative sample data.

Operation conducted by the user on an item includes at least one of: clicking an item by the user, browsing an item by the user for a period exceeds a predetermined time length, predetermined operation conducted by the user on an item. If operation conducted by the user on an item includes clicking the item by the user, items clicked by the user may be taken as positive sample data and items not clicked by user may be taken as negative sample data. If operations conducted by the user on an item include browsing an item by the user for a period that exceeds a predetermined time length, the item browsed by user for a period exceeds a predetermined time length may be taken as positive sample data and the item browsed by user for a period less than a predetermined time length may be taken as negative sample data. If operations conducted by the user on an item include predetermined operations conducted by the user on an item, such as a purchase operation, items bought by the user may be taken as positive sample data and item not bought by the user may be taken as negative sample data. In another example, items bought by the user may also be taken as positive sample data, and items browsed but not bought by the user may be taken as negative sample data, thereby reducing and refining data amount in negative sample data. In another example, predetermined operation conducted by the user on an item may also be a skip operation, a delete operation, such that item skipped or deleted by user may be taken as negative sample data.

If operations conducted by the user on an item includes comments made by the user on an item, then with the further aid of semantic analysis technology and sentiment analysis technology, whether comments made by the user on an item are positive comments or negative comments may be analyzed, thereby differentiating positive sample data from negative sample data.

Alternatively, if data amount in negative sample data is too large, some limits may be added to the capacity of negative sample data, in an embodiment, a predetermined number of items may be randomly selected as negative sample data. In another embodiment of the invention, negative sample data may be filtered according to score given by the user on an item, operations conducted by the user on an item, comments made by the user on an item, such that items the user disliked most are picked up as negative sample data, so that data amount of negative sample data is controlled within a predetermined threshold. For example, if there are too many items scored by user as 1, 2, 3, only items scored by user as 1 may be taken as negative sample data.

In step 203 of FIG. 2, selecting discriminative features of the sample data, wherein the discriminative features include features having discrimination capability for discriminating items in the positive sample data and the negative sample data. The discriminative features function in a more discriminative way than other features in dividing positive and negative samples. For example, if a user likes movies acted by leading role Tom very much and does not like all the movies not acted by leading role Tom, then "leading role Tom" is a discriminative feature.

Figure 3:
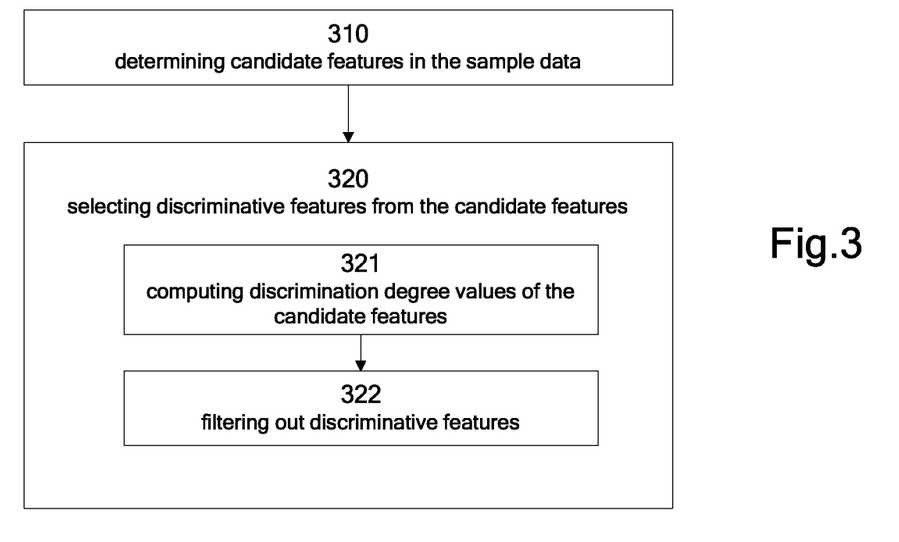
FIG. 3 shows a flowchart of selecting discriminative features according to an embodiment of the invention.

FIG. 3 shows a flowchart of selecting discriminative features according to an embodiment of the invention. According to the embodiment shown in FIG. 3, selecting discriminative features of the sample data further comprises: determining candidate features in the sample data (step 310); and selecting discriminative features from the candidate features (step 320).

According to an embodiment of the invention, the candidate feature further comprises at least one of: structured feature, non-structured feature, wherein the structured feature comprises at least one of: attribute and value of the attribute, attribute; and wherein the non-structured feature comprises a keyword in the sample data. Taking movies, for example, the structured feature may be, e.g., "leading role Tom" (attribute and value of the attribute) or "leading role" (attribute); the non-structured feature may be a keyword in comments on the movie or movie's brief introduction, such as a specific location, etc. Alternatively, if the candidate feature comprises non-structured features, then items need to be analyzed to determine non-structured features therein, for example, identify entity name in movie's brief introduction or comment on the movie (such as location, name, unit name and so on) via named entity identification technology; again, for example, all nouns in items may also be dug out via semantic analysis as non-structured feature, or, nouns whose number of repeatedly occurrence reaches a predetermined threshold in items are dug out via semantic analysis as non-structured feature.

According to an embodiment of the invention, the candidate features further comprise at least one of: static features, and dynamic features. Wherein, static features are inherent features of an item, which will not vary with time during a period of time, for example, "leading role" and "type" of a movie, etc. all belong to static feature. Whereas dynamic features are features that vary dynamically with continuous change in time, for example, list of other movies also watched by other users that watch a same movie, list of other books also bought by other users that buy a same book, list of friends that belong to a same user, and so on.

According to an embodiment of the invention, wherein the candidate feature further comprises at least one of: an original feature, a combinative feature, a general feature. Wherein, the original feature includes original features of items in the sample data. Still taking the movie example, "leading role" is a feature contained in each movie, thus "leading role=Tom" is an original feature in sample data. The combinative feature includes combinations of a plurality of original features, for example, "leading role=Tom, type=comedy" is a combination of two original features ("leading role=Tom" and "type=comedy"). The general feature includes a feature formed by generalizing a plurality of original features, for example, "leading role" is a general feature of "leading role=Tom", "leading role=Jack" and so on. In this example, general feature of "leading role" only includes attribute but not value of attribute.

According to an embodiment of the invention, step 320 further comprises: computing discrimination capability values of the candidate features (step 321); and filtering out discriminative features from the candidate features according to the discrimination capability values (step 322). Alternatively, step 322 may select a candidate feature whose discrimination capability value exceeds a predetermined threshold as discriminative feature. Alternatively, step 203 may only select a candidate feature having positive discrimination capability as discriminative feature. For example, all movies acted by leading role Tom are user preferred movie, while all movies acted by leading role Bob are user disliked movies, thus features "leading role=Tom" and "leading role=Bob" may have same discrimination capability. However, feature "leading role=Tom" appears in positive sample data, while "leading role=Bob" appears in negative sample data, thus "leading role=Tom" is a discriminative feature having positive discrimination capability, while "leading role=Bob" is a discriminative feature having negative discrimination capability. In an implementation, user disliked items may not be taken as target analysis items (such as, only positive recommendation result given by a recommendation system will be taken as target analysis item), thus, there is no need to take discriminative feature "leading role=Bob" having negative discrimination capability as a discriminative feature, this can further reduce storage space occupied for storing discriminative features.

According to another embodiment of the invention, step 320 further comprises: computing discrimination capability values of the candidate features; sorting the candidate features according to the discrimination capability values; and filtering out discriminative features from the sorted candidate features. The present embodiment may be more advantageous in control number of discriminative features, for example, if number of filtered discriminative features can not exceed 8 according to prescription of a specific application scenario, then through the above sorting process, it is more clear which 8 candidate features should be filtered out as discriminative features.

Next, how to compute discrimination capability values of candidate features and filtering out discriminative features will be illustratively described with reference to FIGS. 4A-4C.

Figure 4A:
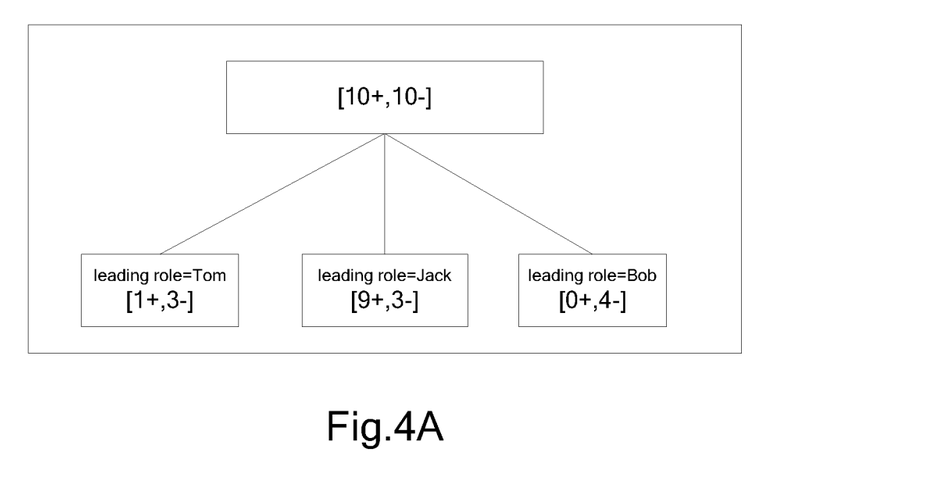
FIG. 4A shows a diagram of sample data according to an embodiment of the invention.

FIG. 4A shows a diagram of sample data according to an embodiment of the invention. In the example of FIG. 4A, assuming that each of positive sample data and negative sample data contains 10 movies, each movie has original features about leading role. In 4 movies in which leading role is Tom, there is 1 movie as positive sample data, 3 movies as negative sample data. In 12 movies in which leading role are Jack, there are 9 movies as positive sample data, 3 movies as negative sample data. In 4 movies in which leading role are Bob, there is no positive sample data and all are negative sample data. In this example, assume that the candidate feature is just the original feature about leading role, i.e., "leading role=Tom", "leading role=Jack" and "leading role=Bob".

According to an embodiment of the invention, the step of computing discrimination capability values of the candidate features (step 321 in FIG. 3) further comprises: computing the discrimination capability values according to a ratio of the number of times the candidate features appear in the positive sample data to the number of times the candidate features appear in the sample data.

The discrimination capability value of a candidate feature in FIG. 4A may be represented by the following formula:

$$D_i = N^+_i / (N^+_i + N^-_i) \qquad \text{Formula. 1}$$

Wherein, $D_i$ represents discrimination capability value of the $i^{-th}$ candidate feature, $N^+_i$ represents the number of the $i^{-th}$ candidate feature appearing in positive sample data, $N^+_i$ represents the number of the $i^{-th}$ candidate feature appearing in negative sample data. In case that the number of positive sample data is equal to the number of negative sample data, discrimination capability value of a candidate feature having minimum discrimination capability is 0.5; for a candidate feature with larger discrimination capability, distance of its discrimination capability value from 0.5 will be larger. Based on formula 1, discrimination capability value of each of candidate features in FIG. 4A is as follows:

$$D(\text{"leading role=Tom"}) = 1/(1+3) = 0.25$$

$$D(\text{"leading role=Jack"}) = 9/(9+3) = 0.75$$

$$D(\text{"leading role=Bob"}) = 0/(0+4) = 0$$

According to an embodiment of the invention, discriminative features may be filtered out from the candidate features according to the discrimination capability values (step 322 in FIG. 3), wherein "leading role=Bob" is a discriminative feature having maximum discrimination capability. If it is set that only candidate feature whose distance of discrimination capability value from 0.5, which is higher than 0.3, is filtered out as a discriminative feature, then only "leading role=Bob" is taken as the discriminative feature. If it is set that all candidate features whose distance of discrimination capability value from 0.5, which is higher than 0.2, is filtered out as discriminative feature, then all the 3 candidate features may be taken as discriminative features.

According to another embodiment of the invention, a discriminative feature having positive discrimination capability may be differentiated from a discriminative feature having negative discrimination capability, wherein discrimination capability value of a discriminative feature having positive discrimination capability is higher than 0.5, and discrimination capability value of a discriminative feature having negative discrimination capability is lower than 0.5. Thus, both "leading role=Tom" and "leading role=Bob" belong to a discriminative feature having negative discrimination capability, that is, the user generally dislikes the movie whose leading role is Tom or Bob. Whereas "leading role=Jack" belongs to a discriminative feature having positive discrimination capability, that is, the user generally likes the movie whose leading role is Jack.

According to another embodiment of the invention, the step of computing discrimination capability values of the candidate features (step 321 in FIG. 3) further comprises: computing the discrimination capability values according to entropy distribution of the candidate features in the positive sample data and the negative sample data and a proportion of the number of times the candidate features appear in sample data relative to total sample data. Since entropy may be used to measure uncertainty of data, discrimination capability value may be computed by means of entropy. A formula for computing discrimination capability value according to the present embodiment is as follows:

$$D_i = \left[ (-P^+_i \log_2 P^+_i - P^-_i \log_2 P^-_i) * \left( \frac{N^+_i + N^-_i}{\text{Sum}} \right) \right] \qquad \text{formula 2}$$

$$P^+_i = \frac{N^+_i}{N^+_i + N^-_i}$$

$$P^-_i = \frac{N^-_i}{N^+_i + N^-_i}$$

In formula 2, $D_i$ represents discrimination capability value of the $i^{-th}$ candidate feature. $P^+_i$, represents a ratio of number of times the $i^{-th}$ candidate feature appears in positive sample data to number of times the $i^{-th}$ candidate feature appears in total sample data, $P^-_i$ represents a ratio of number of times the $i^{-th}$ candidate feature appears in negative sample data to number of times the $i^{-th}$ candidate feature appears in total sample data. $N^+_i$ represents number of the $i^{-th}$ candidate feature appears in positive sample data, $N^-_i$ represents number of the $i^{-th}$ candidate feature appears in negative sample data. Sum represents a sum of data set of positive sample data and negative sample data.

From formula 2, discrimination capability values of each of the candidate features in FIG. 4A may be calculated as follows:

$D$("leading role=Tom")=(−1/4 log₂(1/4)−3/4 log₂(3/4))*4/20=0.81*0.2=0.162

$D$("leading role=Jack")=(−9/12 log₂(9/12)−3/12 log₂(3/12))*12/20=0.81*0.6=0.486

$D$("leading role=Bob")=(−0/4 log₂(0/4)−4/4 log₂(4/4))*4/20=0*0.2=0

The above discrimination capability values not only consider entropy distribution of the candidate features in the positive sample data and the negative sample data, but also consider a proportion of the number of times the candidate features appear in sample data relative to total sample data. For candidate features of "leading role=Tom" and "leading role=Jack", although their entropies are both 0.81, "leading role=Jack" is more representative and its discrimination capability value is greater due to the higher number of times the candidate feature of "leading role=Jack" appears in sample data (up to 12).

Figure 4B:
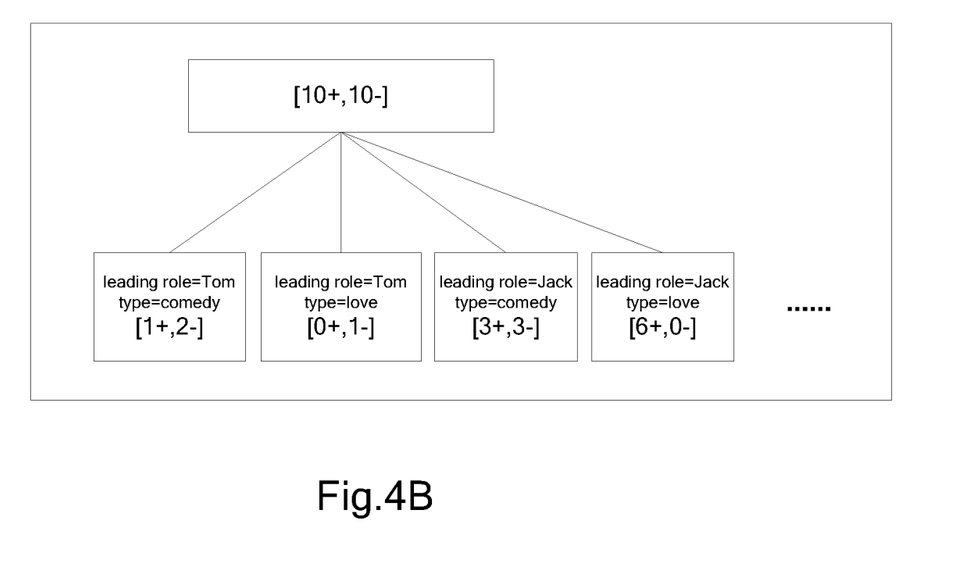
FIG. 4B shows a diagram of sample data according to another embodiment of the invention.

FIG. 4B shows a diagram of sample data according to another embodiment of the invention. In the example of FIG. 4B, an original feature about leading role is combined with an original feature about type, thus the candidate feature is a combinative feature. For example, an original feature "leading role=Tom" is combined with "type=comedy" to form a combinative feature "leading role=Tom, type=comedy". Further, discrimination capability value of each combinative feature (as candidate feature) is computed for each combinative feature. The discrimination capability value of each candidate feature may be computed according to the above formula 1 and formula 2, which will be omitted here for brevity.

Figure 4C:
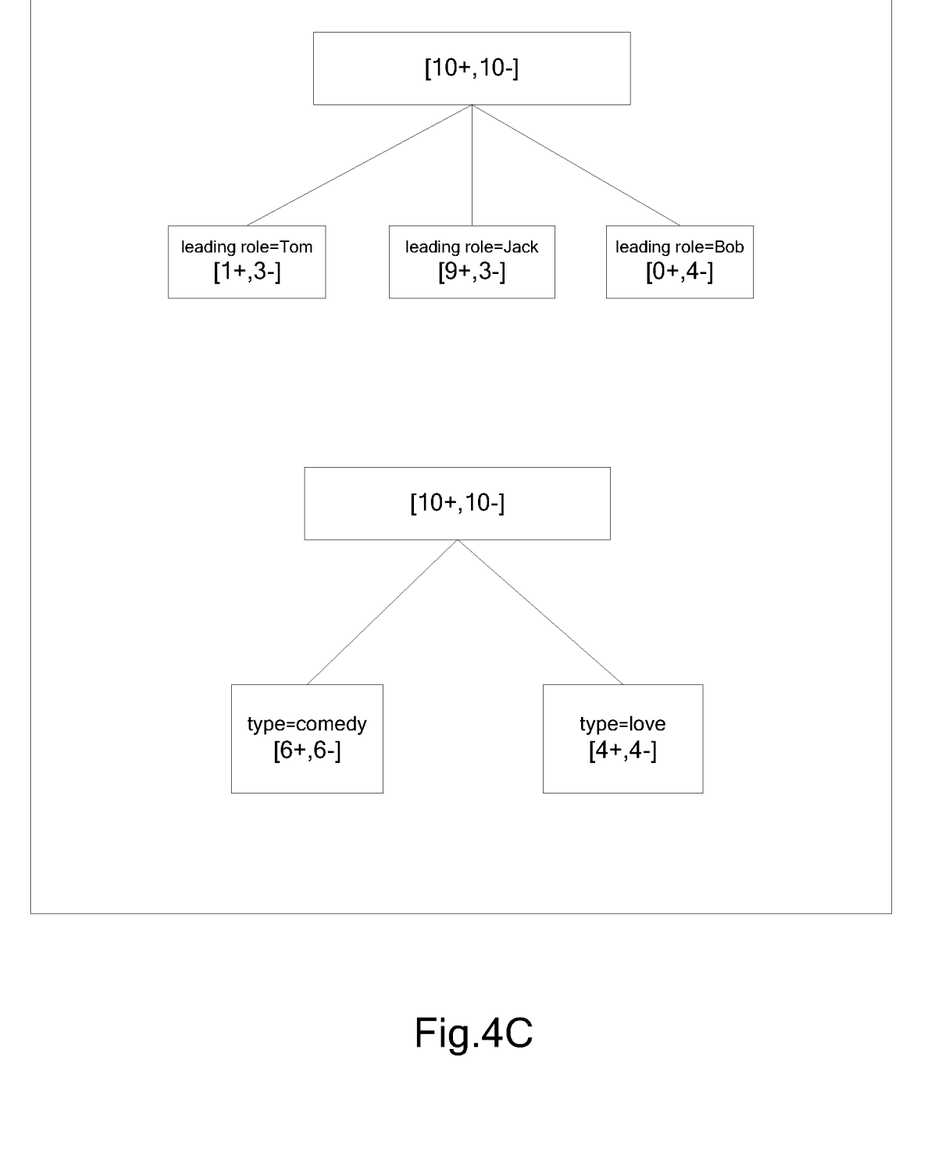
FIG. 4C shows a diagram of sample data according to still another embodiment of the invention.

FIG. 4C shows a diagram of sample data according to still another embodiment of the invention. In the example of FIG. 4C, the general feature includes a feature formed by generalizing a plurality of original features. For example, in the example of FIG. 4C, it is decided which of general feature "leading role" and general feature "type" has higher discrimination capability, so as to filter out discriminative feature, wherein "leading role" is a general feature of original features "leading role=Tom", "leading role=Jack", "leading role=Bob", "type" is a general feature of original features "type=comedy", "type=love".

Discrimination capability value of a general feature may be further calculated with the aid of information gain. Wherein, the information gain represents reduction in uncertainty due to a new classifying manner. Specifically, discrimination capability value of a general feature may be computed according to the following formula 3:

$$D_i = D_0 - D_{ci} \quad \text{formula 3}$$

$$D_0 = -P^+ \log_2 P^+ - P^- \log_2 P^-$$

$$D_{ci} = \sum_j \left[ (-P^+_j \log_2 P^+_j - P^-_j \log_2 P^-_j) * \left( \frac{N^+_j + N^-_j}{\text{Sum}} \right) \right]$$

$$P^+_j = \frac{N^+_j}{N^+_j + N^-_j}$$

$$P^-_j = \frac{N^-_j}{N^+_j + N^-_j}$$

In formula 3, $D_i$ represents discrimination capability value of the $i^{-th}$ candidate feature (general feature). $D_0$ represents discrimination capability value of sample data in an unclassified state, $P^+$ represents a proportion of positive sample data relative to total sample data when sample data is in an unclassified state, $P^-$ represents a proportion of negative sample data relative to total sample data when sample data is in an unclassified state. $D_{ci}$ represents discrimination capability value of the $i^{-th}$ candidate feature when sample data is in current classified state (as shown in FIG. 4C), which comprises a sum of discrimination capability values of respective original features in the $i^{-th}$ general feature. $P^+_j$ represents a ratio of number of the $j^{-th}$ original feature appears in positive sample data to number of the $j^{-th}$ original feature appears in total sample data, $P^-_j$ represents a ratio of number of the $j^{-th}$ original feature appears in negative sample data to number of the $j^{-th}$ original feature appears in total sample data. $N^+_j$ represents number of the $j^{-th}$ original feature appears in positive sample data, $N^-_j$ represents number of the $j^{-th}$ original feature appears in negative sample data. Sum represents a sum of data set of positive sample data and negative sample data.

Based on formula 3, discrimination capability values of general features "leading role" and "type" are calculated as follows:

$$D_0 = -\frac{10}{20} \log_2 \left( \frac{10}{20} \right) - \frac{10}{20} \log_2 \left( \frac{10}{20} \right) = 1$$

$Dc$("leading role") $= (-1/4\log_2(1/4) - 3/4\log_2(3/4)) * 4/20 +$
$(-9/12\log_2(9/12) - 3/12\log_2(3/12)) * 12/20 +$
$(-0/4\log_2(0/4) - 4/4\log_2(4/4)) * 4/20 = 0.648$ $D$("leading role") $= 1 - 0.648 = 0.352$ $Dc$("type") $= (-6/12\log_2(6/12) - 6/12\log_2(6/12)) * 12/20 +$
$(-4/8\log_2(4/8) - 4/8\log_2(4/8)) * 8/20 = 1$ $D$("type") $= 1 - 1 = 0$ It can be seen that, discrimination capability value of general feature "leading role" is greater than that of general feature "type", thus general feature "leading role" is selected as discriminative feature.

Returning to FIG. 2, in step 205, determining, for at least one target analysis item, whether it has at least one discriminative feature. In an embodiment, the target analysis item may have only one discriminative feature. In another embodiment, the target analysis item may have a plurality of discriminative features, in this case, discriminative feature correlated to the target analysis item may be further determined according to a limit in number of discriminative features correlated to the target analysis item. For example, if only one discriminative feature is allowed to be correlated to the target analysis item, a discriminative feature having the largest discrimination capability value may be selected to be correlated to the target analysis item.

In step 207, correlating the at least one target analysis item with the at least one discriminative feature in response to having the at least one discriminative feature. According to an embodiment of the invention, the step of correlating the at least one target analysis item with the at least one discriminative feature further comprises: presenting the at least one target analysis item to the user along with at least one correlated discriminative feature, such that the user can view the at least one discriminative feature while viewing the at least one target analysis item.

According to an embodiment of the invention, wherein the at least one target analysis item is at least one recommended item, and the step of filtering out discriminative features further comprises: filtering out candidate feature(s) having positive discrimination capability as discriminative feature. The embodiment is applicable to provide a reasonable explanation for results recommended by a recommendation system. That is, most of current recommendation systems provide a user with only recommendation results, but they do not explain why these recommendation results are recommended, or the explanation of recommendation results provided to the user is not a personalized one, but is a general, constant one. In the present application scenario, the user may be provided with explanation of recommendation results (for example, the reason of recommending this movie to user is that this movie is acted by Jack). Of course, the method in the invention may be performed by a recommendation system, or be performed independent of recommendation system.

In another scenario, the data analysis method may be used for recommending more items to the user based on the at least one discriminative feature, that is, the discriminative feature may be further fed back to the recommendation system so as to generate or correct recommendation result.

In still another scenario, the data analysis method may be used for collecting statistics about what is the at least one discriminative feature that is the most important to one or more users, so as to make more reasonable layout for attributes of items, such that the most important attribute is presented at a most obvious location.

In other scenarios, the selected discriminative features may also be used to perform wider data analyzing and digging, and the invention has no specific limitation thereon.

The data analysis method in the invention has been described above, and a data analysis system under the same inventive concept will be described with reference to FIG. 5 and FIG. 6, wherein same or corresponding implementation details have been completely described in detail above, and will be omitted hereafter for brevity.

Figure 5:
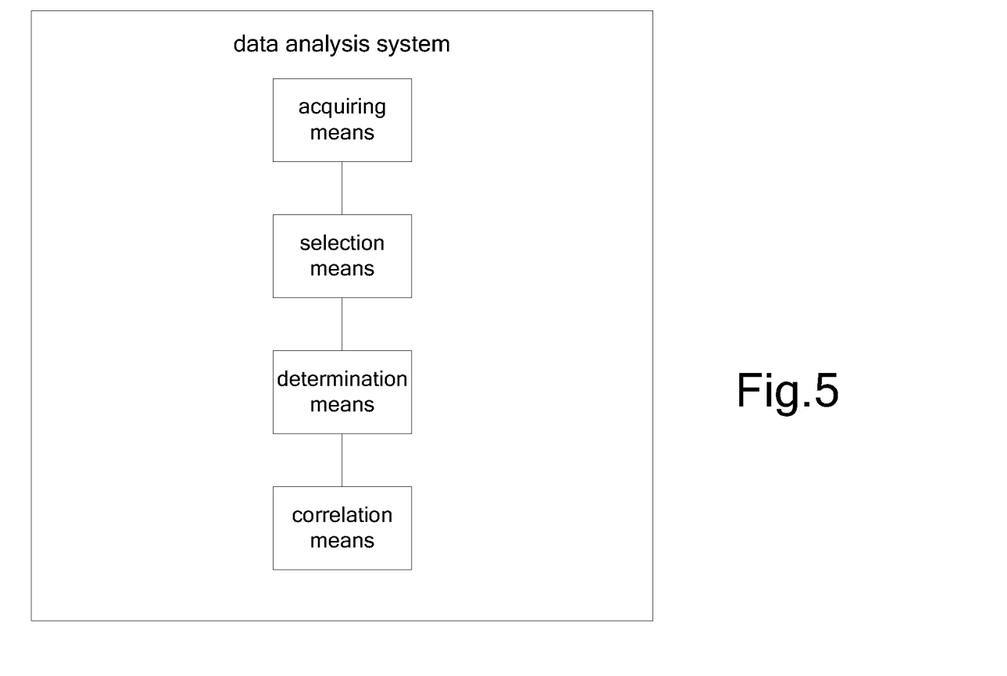
FIG. 5 shows a diagram of a data analysis system according to an embodiment of the invention.

FIG. 5 shows a diagram of a data analysis system according to an embodiment of the invention. The data analysis system in FIG. 5 comprises: an acquiring means configured to acquire sample data, wherein the sample data contains positive sample data and negative sample data, the positive sample includes user preferred items and the negative sample data includes user disliked items; a selection means configured to select discriminative features of the sample data, wherein the discriminative features include features having discrimination capability for discriminating items in the positive sample data and the negative sample data; a determination means configured to determine, for at least one target analysis item, whether it has at least one discriminative feature; and a correlation means configured to correlate the at least one target analysis item with the at least one discriminative feature in response to having the at least one discriminative feature.

According to an embodiment of the invention, the acquiring means is further configured to: acquire sample data according to at least one of: operation history of the user, recommendation result generated by a recommendation system for the user.

According to an embodiment of the invention, the operation history comprises at least one of: score given by the user on an item, operation conducted by the user on an item, comment made by the user on an item.

Figure 6:
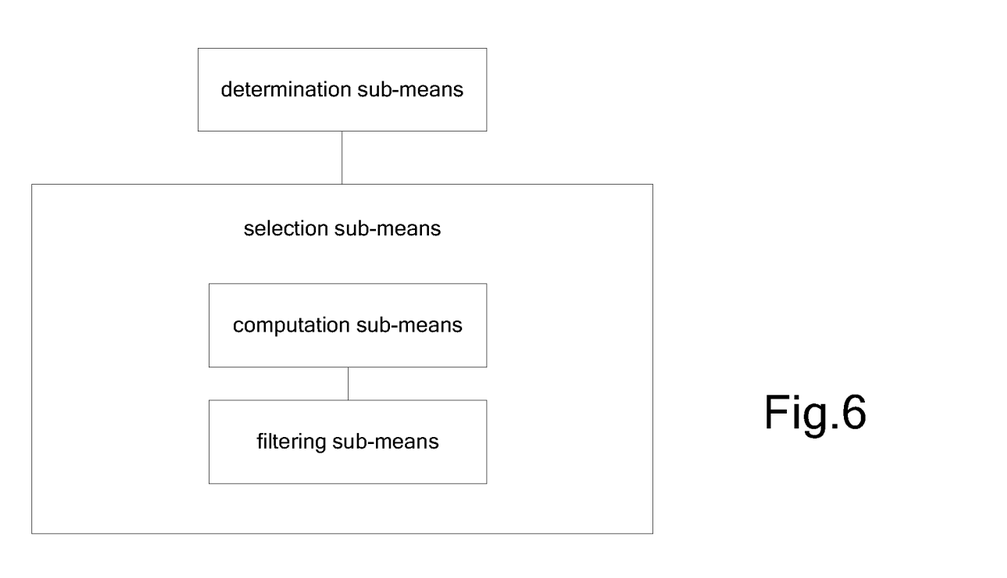
FIG. 6 shows a diagram of a selection means according to an embodiment of the invention.

FIG. 6 shows a diagram of the selection means according to an embodiment of the invention. According to the embodiment of FIG. 6, the selection means further comprises: a determination sub-means configured to determine candidate features in the sample data; and a selection sub-means configured to select discriminative features from the candidate features.

According to an embodiment of the invention, wherein the candidate feature further comprises at least one of: structured feature, non-structured feature, wherein the structured feature comprises at least one of: attribute and value of the attribute, attribute; and wherein the non-structured feature comprises keyword in the sample data.

According to an embodiment of the invention, the candidate feature further comprises at least one of: an original feature including original features of items in the sample data; a combinative feature including combinations of a plurality of original features; a general feature including a feature formed by generalizing a plurality of original features.

According to an embodiment of the invention, the selection sub-means further comprises: a computation sub-means configured to compute discrimination capability values of the candidate features; a filtering sub-means configured to filter out discriminative features from the candidate features according to the discrimination capability values.

According to another embodiment of the invention, the selection sub-means further comprises: a computation sub-means configured to compute discrimination capability values of the candidate features; a sorting sub-means configured to sort the candidate features according to the discrimination capability values; and a filtering sub-means configured to filter out discriminative features from the candidate features according to the discrimination capability values.

According to an embodiment of the invention, the computation sub-means is further configured to: compute the discrimination capability values according to a ratio of the number of times the candidate features appear in the positive sample data to the number of times the candidate features appear in the sample data.

According to another embodiment of the invention, the computation sub-means is further configured to: compute the discrimination capability values according to entropy distribution of the candidate features in the positive sample data and the negative sample data and a proportion of the number of times the candidate features appear in sample data relative to total sample data.

According to an embodiment of the invention, the at least one target analysis item is at least one recommended item, the filtering sub-means is further configured to: filter out candidate features having positive discrimination capability as discriminative features.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A personalized recommendation system, the system comprising:
    a communication network having systems linked be a communication link;
    a server, including a processor and a memory coupled to said processor, connected to the communication network, the memory having server program code configured to:
        acquire a user's sample data over the communication network, wherein the user's sample data includes positive sample data and negative sample data, the positive sample includes user preferred items and the negative sample data includes user disliked items;
        select discriminative features of the user's sample data, wherein the discriminative features include features having discrimination capability for discriminating items in the positive sample data and the negative sample data;
        determine, for each of a plurality of target analysis items, whether at least one analysis item from the plurality of target analysis items has at least one discriminative feature;
        correlate the at least one target analysis item with the at least one discriminative feature, using said processor, in response to having the at least one discriminative feature;
        generate a personalized recommendation for the user including the correlated at least one target analysis item with the at least one discriminative feature, the generating the personalized recommendation comprising reducing processing requirements for the generating by filtering out all target analysis items having negative discrimination capability and including only target analysis items having positive discrimination capability for analysis; and
    a remote system, including a processor and a memory coupled to said processor, connected to the communication network, the memory having remote program code configured to:
        capture user sample data from the user including the positive sample data that includes the user preferred items and the negative sample data that includes the user disliked items, the capturing the user sample data further comprising reducing storage requirements by filtering out the negative sample data and storing only the positive sample data for presentation to the user; and
        display the personalized recommendation for the user on a display responsive to the user preferred items including at least one target analysis item with the at least one discriminative feature to inform the user which at least one discriminative feature was utilized to recommend the at least one target analysis item to the user.

2. The system according to claim 1, wherein the server program code is further configured to:
    acquire the user's sample data according to at least one of: operation history of the user, recommendation result generated by a recommendation system for the user.

3. The system according to claim 2, wherein the operation history comprises at least one of:
    score given by the user on an item, operation conducted by the user on an item, comment made by the user on an item.

4. The system according to claim 1, wherein the server program code is further configured to:
    determine candidate features in the user's sample data; and
    select discriminative features from the candidate features.

5. The system according to claim 4, wherein the candidate feature further comprises at least one of: structured feature, non-structured feature,
    wherein the structured feature comprises at least one of: attribute and value of the attribute, attribute; and
    wherein the non-structured feature comprises keyword in the sample data.

6. The system according to claim 4, wherein the candidate feature further comprises at least one of:
    an original feature including original features of items in the user's sample data;
    a combinative feature including combinations of a plurality of original features; and
    a general feature including a feature formed by generalizing a plurality of original features.

7. The system according to claim 4, wherein the server program code is further configured to:
    compute discrimination capability values of the candidate features; and
    filter out discriminative features from the candidate features according to the discrimination capability values.

8. The system according to claim 7, wherein the server program code is further configured to:
    compute the discrimination capability values according to a ratio of the number of times the candidate features appear in the positive sample data to the number of times the candidate features appear in the sample data.

9. The system according to claim 7, wherein the server program code is further configured to:
    compute the discrimination capability values according to entropy distribution of the candidate features in the positive sample data and the negative sample data and a proportion of the number of times the candidate features appear in sample data relative to total sample data.

10. The system according to claim 7, wherein the at least one target analysis item is at least one recommended item, the server program code is further configured to:

select candidate features having positive discrimination capability as discriminative features.

* * * * *